Dec. 7, 1971 J. C. AYER 3,624,879
CUTTER WITH NESTED INDEXABLE BLADE CLAMPED BY
SCREW ACTUATED WEDGE
Filed Jan. 19, 1970 2 Sheets-Sheet 2
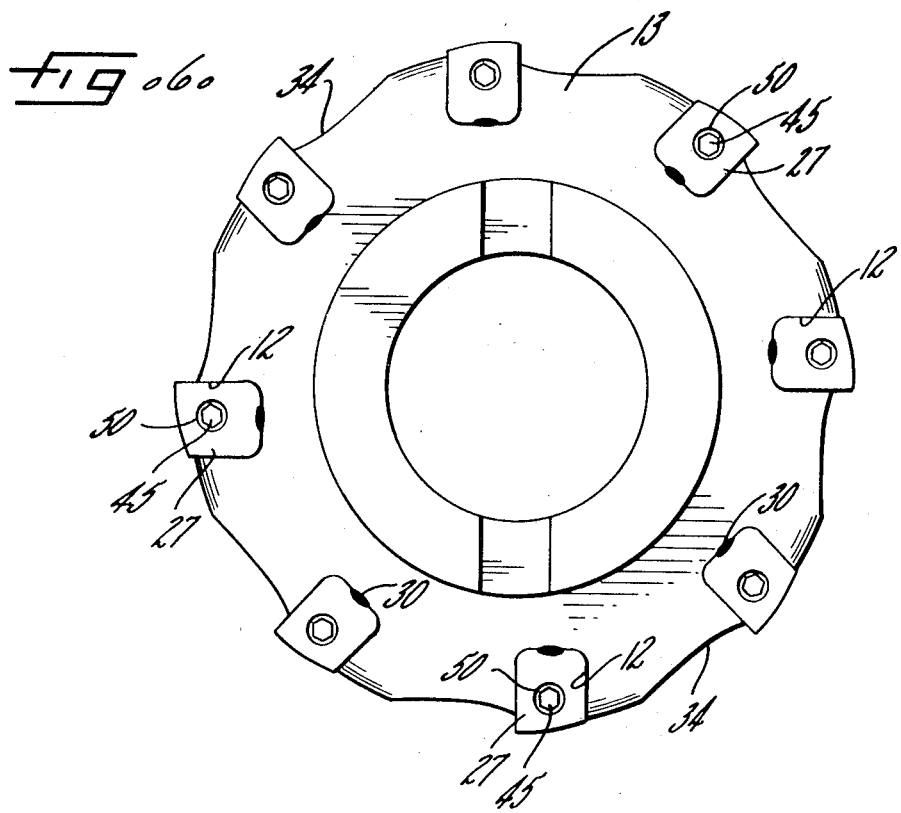
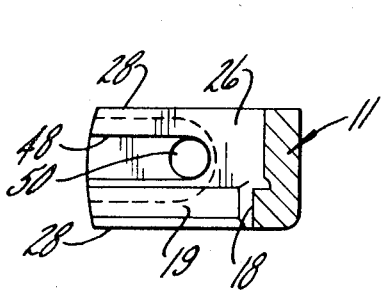
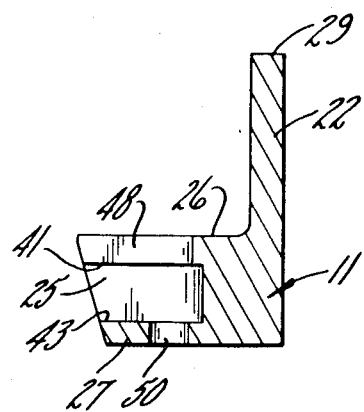
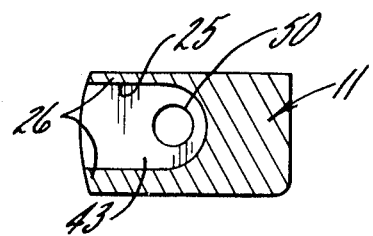
INVENTOR.
JAMES C. AYER
BY
Wolfe, Hubbard, Leydig, Voit & Osann
ATTORNEYS.

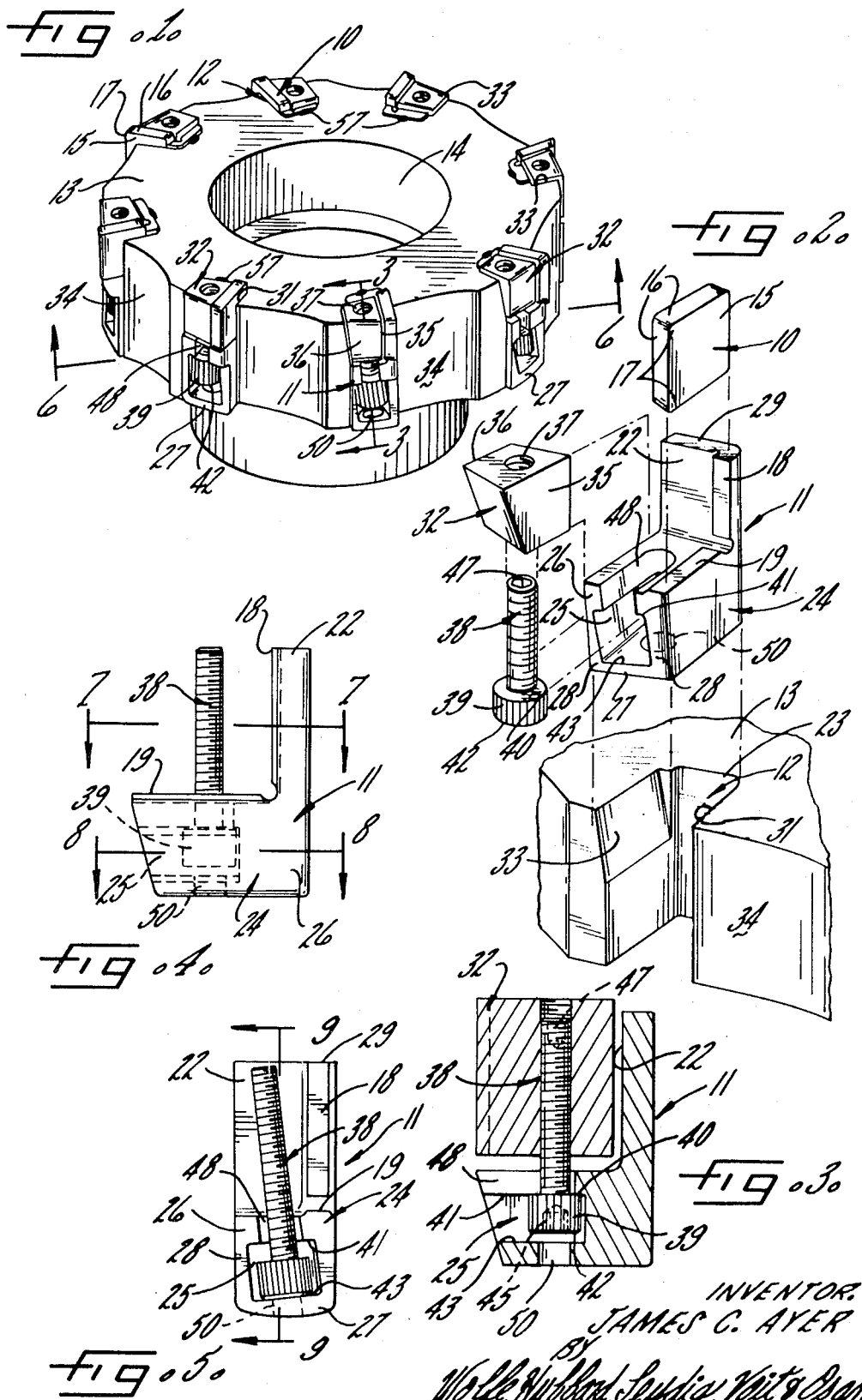

United States Patent Office 3,624,879
Patented Dec. 7, 1971

3,624,879
CUTTER WITH NESTED INDEXABLE BLADE CLAMPED BY SCREW ACTUATED WEDGE
James C. Ayer, Rockford, Ill., assignor to The Ingersoll Milling Machine Company, Rockford, Ill.
Filed Jan. 19, 1970, Ser. No. 3,687
Int. Cl. B26d 1/12
U.S. Cl. 29—105        7 Claims

ABSTRACT OF THE DISCLOSURE

In the disclosed face milling cutter, square and indexable inserts of cutting material are clamped in cutting position between a wedge and an opposed wall of a body slot by inward drawing of a wedge during tightening of a screw threading only into the wedge and having a head whose underside, during tightening of the screw, presses against an abutment on a nest which provides a seat for locating the insert in its various indexed positions and is temporarily replaceably fixed in a slot of the cutter body by tack welds at opposite ends of the nest.

BACKGROUND OF THE INVENTION

This invention relates to metal-removing cutters in which an indexable blade in the form of a wafer of polygonal shape is seated in a holder or so-called nest securely anchored in a body slot by tack welding and clamped against a side of the slot by a wedge drawn into the slot by tightening of a screw. Heretofore, such clamping is effected by threading the screw into the cutter body. In the event of a wreck in service use of the cutter, the screw as well as the nest are frequently broken, the cutter body thus being damaged so that the cutter cannot be repaired easily.

SUMMARY OF THE INVENTION

In the present invention, the thread of the wedge actuating screw is in the wedge which is tightened by engagement of the underside of a head on the screw with an abutment on the nest, the free end of the screw head being engageable with a spaced and opposed abutment on the nest to release the wedge as the screw is turned reversely and thus loosened.

The invention also resides in the novel construction of the nest and arrangement of the opposed abutments thereon to tighten and release the wedge while permitting easy separation of the screw head from the nest when replacement of the latter becomes necessary.

BRIEF DESCRIPTION OF THE DRAWINGS

FIG. 1 is a perspective view of a face milling cutter embodying the novel features of the present invention.

FIG. 2 is an exploded perspective view showing a slot of the cutter body together with an indexable insert, its supporting nest, wedge, and actuating screw.

FIG. 3 is a section taken along the line 3—3 of FIG. 1.

FIGS. 4 and 5 are elevational and plan views of the blade nest.

FIG. 6 is an inner end view taken along the plane of the line 6—6 in FIG. 1.

FIGS. 7 and 8 are sections taken respectively along the lines 7—7 and 8—8 of FIG. 4.

FIG. 9 is a section taken along the line 9—9 of FIG. 5.

DESCRIPTION OF THE PREFERRED EMBODIMENT

While the invention is adaptable for use in other types of material-removing tools, it is illustrated in the drawings incorporated in a face milling cutter in which wafer-like inserts 10 of cutting material are seated in and adapted for indexing relative to holders or so-called nests 11 securely but replaceably fixed in radially opening slots 12 formed in and spaced around the periphery of the body in the form of a ring 13. A center hole 14 in the latter is adapted to receive a spindle to which the ring is keyed in a conventional way for rotation therewith.

While the inserts 10 may be of various peripheral shapes, each is square in the form illustrated and formed with a flat cutting face 15 and edges or clearance faces 16 normal thereto thus providing eight available corners 17 in active cutting position in the different positions to which the insert may be indexed relative to the seat provided by accurately machined and located surfaces 18 and 19 on the nest. One edge 16 of the insert rests on the surface 18 and an adjacent edge abuts against the surface 19 leaving the diagonally opposite corner 17 exposed and positioned for cutting engagement with a workpiece.

The nest is preferably a casting comprising an elongated bar 22 resting on the bottom 23 of the slot 12 and having the surface 18 formed along the outer end and at one side end thereof. Upstanding from the other end of the bar is a hollow lug 24 having an outwardly opening recess 25 defined by a crosspiece 26 intermediate the ends of the bar and connected by side webs 28 with a crosspiece 27 at the inner end of the bar. After seating thereof in the body slot, the nest is securely but replaceably fixed to the body, in this instance by a tack weld 57 at the outer end 29 of the bar, as shown in FIG. 1, and a similar tack weld 30 (FIG. 6) at the inner end.

It will be apparent that the insert, when any corner thereof is seated in the nest, will present a corner 17 adapted for cutting engagement with a workpiece and removal of a chip therefrom during rotation of and edgewise feeding of the body along the workpiece for face or contour milling or axially for cylinder boring. A part of the body ahead of the leading or cutting face of the insert is recessed as indicated at 34 to provide the necessary clearance for chips removed by each active cutting edge. The inserts constructed and mounted as shown, operate with negative rake but of course may be mounted to operate with positive rake.

Each insert is held securely against the leading wall 31 of its slot by a wedge 32 which is disposed between the back of the insert and the trailing inclined wall 33 of the slot and is formed with opposite side walls 35, 36 which converge inwardly along the slot so as to be pressed against the insert and slot walls as the wedge is drawn inwardly along the nest after seating in one of its available positions in the nest.

In accordance with the present invention, the wedge is formed with a threaded hole 37 which extends parallel to the trailing and inclined wall 33 and preferably throughout the full length of the wedge. The end portion of the shank of a screw 38 threads into the inner end of the hole while an intermediate part projects along the nest and lies in a recess 48 in the crosspiece 26 with the screw head 39 disposed in the recess 25 between the two crosspieces. Herein, the recess is somewhat wider than the diameter of the screw shank and opening radially and outwardly. The head 39 is generally cylindrical and somewhat shorter than the spacing of the abutments 41 and 43 formed by the opposed faces of the crosspieces 26 and 27. Thus, as the shank is screwed into the wedge hole 37, the underside of the head comes into engagement with the abutment 41 and further tightening draws the wedge inwardly along the body slot so as to clamp the insert in the nest and against the slot wall 31.

In the clamped position of the insert, the inner or free end 42 of the screw is spaced, as shown in FIGS. 1 and 3, a short distance from an abutment 43 formed by the crosspiece 27. Thus, as the screw is loosened from the position shown in FIG. 3 by reverse turning, the head is backed away from the abutment 41 and into engagement with the abutment 43. Then, as the turning of the screw is continued, the wedge 32 will be forced outwardly along the body slot thus releasing the insert to permit removal thereof and indexing to a different position for presenting another one of the tips 17 in active cutting position. After such indexing, the screw is again tightened to draw the wedge inwardly and clamp the insert in its new position.

Turning of the screw into and out of the wedge to clamp and release the insert may be effected by a suitable tool inserted in a non-circular recess 45 (FIGS. 3 and 6) in the inner end of the screw head and accessible through a hole 50 in the inner crosspiece 27 of the nest. Alternately, the screw may be turned by a tool inserted in the non-circular recess 47 (FIGS. 2 and 3) in the outer end of the screw shank which hole is exposed by extending the threaded hole 37 through the full length of the wedge 32. This end of the screw may be engaged by the tool when it is desired to index the insert to present a fresh tip 17 in cutting position. For this purpose, the screw is backed off to release the wedge and then again tightened after the indexing of the insert.

In another of its aspects, the invention contemplates shaping of the holes or recesses in the crosspieces 26 and 27 of the nest 11 to permit removal of the screw from the wedge and the nest wherever it becomes necessary to replace the nest after damaging thereof in service use. While this may be accomplished in various ways while preserving the above described action of the abutments 41 and 43, it is achieved in the disclosed embodiment by forming a hole 50 in the inner crosspiece 27 for receiving a screw turning tool. Thus, after the screw is loosened to release the wedge, it may be lifted bodily and transaxially out of the notch 48 and past the abutment 43. After such removal of the screw, the wedge and the insert may be lifted out of the body slot. Then after breaking of the tack welds 30 and 57, the nest, if damaged, may be removed from the body and a new nest placed in the slot and again secured by new tack welds.

It will be apparent from the foregoing, that the inserts 10 are locked in and released from active positions and adapted for easy indexing simply by tightening and loosening the screw 38 to thread its shank into and out of the wedge. Thus, all of the functions incident to clamping and indexing the insert are effected by coaction of the nest and screw so that, in a wreck occurring in service use, the body of the cutter is seldom damaged so that the cutter can be repaired at low cost simply by replacing the nest which is a casting that may be manufactured at low cost.

I claim:

1. In a material removing cutter, the combination of, a body having an elongated slot therein open along one side and at opposite ends and defined by bottom and opposed side walls upstanding therefrom and inclined at a wedge angle to each other, a cutting blade in the form of a flat wafer thinner than the width of said slot and disposed in one end of said slot with one side face lying against a first one of said walls, an elongated holder for said blade rigidly secured to said body and including a bar extending through said slot along the bottom thereof and having opposed first and second upstanding abutments and extending crosswise of said slot and spanning said walls, the first abutment being disposed intermediate the ends of said holder and cooperating with one end of said bar to form a nest for seating of said blade therein with one peripheral edge portion thereof engaging said bar and the adjacent face of said first abutment and a similar opposite edge portion disposed in cutting position beyond the end of said slot, a wedge disposed in said slot beyond said first abutment and between said blade and the other slot wall and having opposed side faces converging inwardly toward said first abutment, and a screw having a head shorter than the space between said abutments and disposed between such abutments with the shank thereof extending along said slot through said first abutment and threading into a hole in the inner end of said wedge whereby the shank end of said head engages said first abutment as the screw is turned in one direction to screw said shank into said wedge and draw the latter into said slot, thus clamping the nested blade against said first slot wall, the free end of said head, when the screw is turned reversely, engaging said second abutment whereby to force said wedge outwardly along said slot as said shank is screwed out of the wedge thus releasing said blade for indexing within said nest.

2. A cutter as defined in claim 1 in which one end of said screw is exposed and recessed to receive a tool by which the screw may be turned into and out of said wedge.

3. A cutter as defined in claim 1 in which said threaded hole extends through said wedge and the end of the screw shank thus exposed is recessed to receive a tool for turning the screw to tighten and loosen the wedge so as to permit of indexing of said blade relative to said nest.

4. A cutter as defined in claim 1 in which one of said abutments is shaped to permit removal of said screw after retraction of the latter to loosen said wedge.

5. A cutter as defined in claim 1 in which the screw shank extends through a notch opening radially and outwardly from said slot to permit bodily shifting of the loosened screw and wedge out of said slot and across said second abutment.

6. A cutter as defined in claim 1 in which said holder is secured in said body by welds at opposite ends of said bar.

7. A cutter as defined in claim 5 in which access to said screw head recess is afforded by a hole extending along said slot and through said second abutment.

References Cited

UNITED STATES PATENTS

| 3,192,602 | 7/1965 | Copeland | 29—96 |
| 3,299,491 | 1/1967 | Hall | 29—96 |
| 3,239,911 | 3/1966 | Williams | 29—96 |
| 3,138,847 | 6/1964 | Berry, Jr. | 29—105 |
| 3,391,438 | 9/1968 | Mileski | 29—105 |

FOREIGN PATENTS

| 689,601 | 6/1964 | Canada | 29—105 |
| 940,895 | 11/1963 | Great Britain | 29—105 |

HARRISON L. HINSON, Primary Examiner